United States Patent [19]

Wycech

[11] Patent Number: 4,695,343
[45] Date of Patent: Sep. 22, 1987

[54] METHOD OF REINFORCING A STRUCTURAL MEMBER

[75] Inventor: Joseph S. Wycech, Grosse Pointe Farms, Mich.

[73] Assignee: General Motors Corporation, Detroit, Mich.

[21] Appl. No.: 864,311

[22] Filed: May 19, 1986

Related U.S. Application Data

[60] Division of Ser. No. 674,226, Nov. 23, 1984, Pat. No. 4,610,836, which is a continuation-in-part of Ser. No. 531,058, Sep. 12, 1983, abandoned.

[51] Int. Cl.[4] .......................... B28B 7/30; B29C 33/78
[52] U.S. Cl. ..................................... 156/196; 156/212; 156/242; 156/284; 264/313; 264/317; 264/DIG. 6; 264/DIG. 10; 425/DIG. 12; 428/241; 428/251; 428/313.9; 249/62
[58] Field of Search ............... 156/196, 212, 213, 242, 156/245, 278, 284, 306.9; 264/36, 46.6, 46.7, 86, 109, 112, 221, 257, 313, 317, DIG. 6, DIG. 8, DIG. 9, DIG. 10; 249/61, 62; 425/DIG. 12; 428/241, 251, 283, 285, 313.9, 325

[56] References Cited

U.S. PATENT DOCUMENTS

| | | | |
|---|---|---|---|
| 2,454,910 | 11/1948 | Carr | 264/112 |
| 2,806,509 | 9/1957 | Bozzacco et al. | 264/109 |
| 3,909,058 | 9/1975 | Kramer et al. | 293/133 |
| 4,013,810 | 3/1977 | Long | 156/242 |
| 4,040,165 | 8/1977 | Messler et al. | 264/109 |
| 4,107,833 | 8/1978 | Knight et al. | 29/460 |
| 4,323,623 | 4/1982 | Ahrens et al. | 428/246 |
| 4,362,778 | 12/1982 | Andersson et al. | 428/240 |
| 4,363,690 | 12/1982 | Gagliani et al. | 156/307.5 |
| 4,405,543 | 9/1983 | Murphy et al. | 264/109 |
| 4,433,068 | 2/1984 | Long et al. | 521/54 |

OTHER PUBLICATIONS

"Reduce Part Weight and Cost with Hollow Microspheres Plastics", Dr. Elaine C. Barber.
"Tiny Bubbles Beef up Plastics, Cut Costs and Reduce Weight", 1977.
"Shedding Pounds in Plastics: Microspheres are Moving", Robert H. Wehrenberg II, 1978.

*Primary Examiner*—Caleb Weston
*Attorney, Agent, or Firm*—Charles E. Leahy

[57] ABSTRACT

Method and apparatus is provided for reinforcing a structural member of a vehicle body by the use of adhesively bonded together glass macrospheres of 3 to 9 mm. in diameter. The adhesive is not more than about 40% by weight of the mixture so that voids remain between the adjacent macrospheres to permit airflow through the reinforcement and the reinforced structural member upon curing adhesive. The adhesive may be curable at ambient temperature or may be a high temperature curable adhesive which is cured in a vehicle body paint curing over to bond the macropsheres to one another and to the structural member. The adhesion of the macrospheres to the structural member may be facilitated by an epoxy coated flexible sheet material lining the walls of the structural member. The adhesive coated macrospheres may be closely packed into the structural member by pouring or blowing.

7 Claims, 5 Drawing Figures

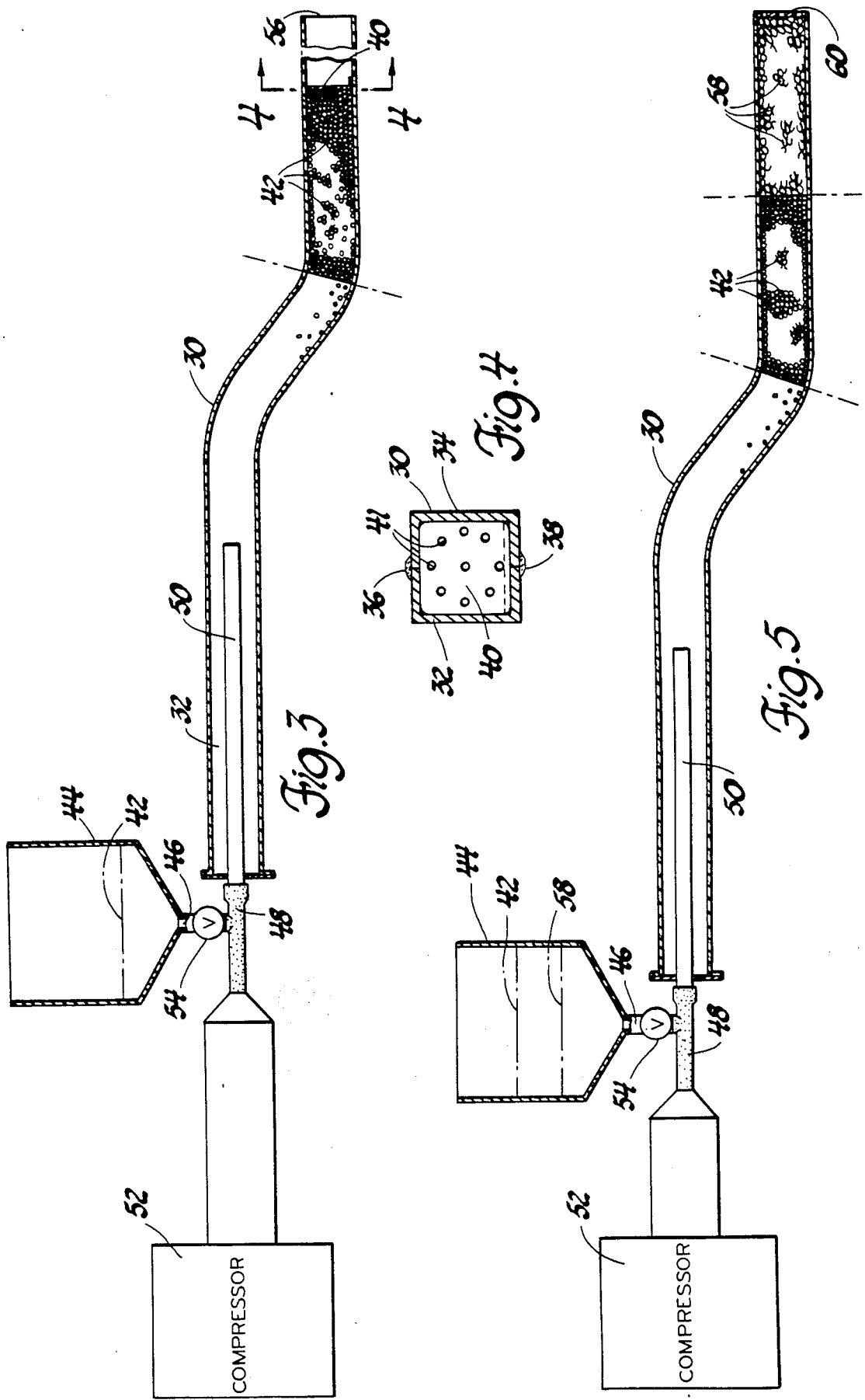

METHOD OF REINFORCING A STRUCTURAL MEMBER

This is a divisional of copending application Ser. No. 674,226 filed on Nov.23, 1984, U.S. Pat. No. 4,610,836, which is a continuation-in-part of Ser. No. 531,058 filed Sept. 12, 1983, abandoned.

The invention relates to a method and apparatus for reinforcing the structural member of a vehicle body and more particularly relates to the use of adhesively bound together glass macrospheres having airflow maintaining interstices therebetween and secured within the confines of the structural member by an adhesive.

BACKGROUND OF THE INVENTION

It is well known to reinforce the structural members of a vehicle body by welding or otherwise suitably attaching a metal panel to overlie the structural member or to overlie portions of adjoining structural members at a body joint.

It is also known to reinforce a vehicle structural member by filling a cavity in the structural member with a structural foamed plastic. A disadvantage of filling a cavity with foamed plastic is that the flow of air is prevented so that moisture can be entrapped inside the structural member. The aforedescribed reinforcing techniques are used in whichever portions of the vehicle structure might require stiffening, reinforcing, strengthening or stabilizing. One such example of the use of a foamed plastic is shown in Kramer U.S. Pat. No. 3,909,058 issued Sept. 30, 1975.

It is also known to reinforce plastic structures formed of SMC and BMC materials by the addition of hollow glass microspheres, also known as glass bubbles and micro balloons. These microspheres may be made of a plastic such as phenolic or polyvinyladene chloride or from an inorganic material such as glass and have a diameter of 0.020 mm. to 0.150 mm. This use of microspheres is known to reduce weight, improve impact resistance, and add stiffness. As such these microspheres filled syntactic foams have found use in the boating, aircraft, automotive and furniture industries. Furthermore, such microspheres may be mixed with a curable thermosetting resin to make a granular mixture which may be packed into a shaped cavity as taught by Murphy U.S. Pat. No. 4,405,543 issued September 1983.

It is also known to form a macrosphere by use of a resin to bond together a large number of microspheres into a larger sphere having a diameter of 0.5 to 10 millimeters. These macrospheres can also be used in a foam and are useful in boat hull construction and other floatation structures requiring high strength and light weight. Miessler et al U.S. Pat. No. 4,040,165 issued August 1977 is an example of such a buoyant structure in which a syntactic foam fills the voids between glass macrospheres.

The present invention provides a new and improved reinforcement method and apparatus whereby glass macrospheres may be employed to reinforce a structural member without preventing airflow therethrough.

SUMMARY OF THE INVENTION

According to the invention a vehicle body structural member is reinforced by filling a cavity with a plurality of glass macrospheres which are coated with an adhesive to bond with one another and the structural member. The adhesive may be an adhesive which cures at ambient temperature or a heat curable adhesive which cures when the vehicle passes through a paint curing oven. The macrospheres have a diameter of 3 to 9 mm. and the adhesive constitutes 30–40% by weight of the mixture so that the adhesive does not fill the voids between the macrospheres and thereby permits airflow through the reinforced structural member.

In one embodiment a flexible sheet material such as fiberglass cloth is dipped or otherwise saturated with a low temperature cured one-part epoxy and then at least one face of the fiberglass cloth is coated with a high temperature cured one-part epoxy. The low temperature cured epoxy imparts sufficient stiffness to the fiberglass cloth to enable the cloth to be stamped or otherwise deformed and shaped to fit within the confines of the structural member to be reinforced. A plurality of glass macrospheres of 3 to 9 millimeters in diameter are coated with a low temperature cured adhesive in a mixer and then poured into the formed epoxy coated cloth where they become adhered to each other and the cloth while a space remains between the adjacent macrospheres. Subsequent heating of the structural member in a paint oven cures the high temperature cured epoxy to effect adhesive bonding between the epoxy coated cloth and the structural member so that the macrospheres become adhesively bonded to the structural member via the epoxy coated cloth to reinforce the structural member.

In a second embodiment the glass macrospheres are blown into a hollow structural member via a venturi feed tube device fed from a hopper. The macrospheres may be coated with a dry, one-part adhesive in the hopper or sprayed with adhesive upon exiting the feed tube. A baffle may be positioned within the hollow structural member to position the macrospheres at the localized portion of the structural member to be reinforced. Alternatively the macrospheres can be positioned at the desired location within the structural member by loading a charge of heat vaporizable material such as styrofoam pellets into the hopper before the macrospheres so that the volume of the styrofoam fills the ends of the hollow structural member before the macrospheres enter the structural member and are then vaporized by the heat of the paint curing oven.

Accordingly, the object, feature and advantage of the present invention resides in the method for reinforcing a structural member by forming an epoxy coated cloth into the shape of the structural member, coating macrospheres of 3 to 9 mm. diameter with a heat-cured adhesive comprising not more than 40% of the mixture so that open air communication interstices will remain between the macrospheres, filling the cloth with adhesive covered macrospheres, and heating the structural member and epoxy covered cloth to effect adhesive bonding between the cloth and the structural member whereby the epoxy covered cloth effects adhesive bonding between the bound together macrospheres and the structural member to reinforce the structural member.

A further feature, object and advantage of the invention resides in the provision of a structural member reinforcement including a flexible sheet material impregnated with an adhesive and formed into the shape of the structural member and filled with a plurality of adhesively bound glass macrospheres with the epoxy coated cloth being adhered to the structural member by a curable epoxy.

A further feature, object and advantage of the invention resides in the method of reinforcing the hollow structural member by blowing adhesive covered macrospheres into the structural member, said macrospheres being coated with a curable adhesive.

A further feature, object and advantage of the invention resides in the provision of a baffle within a hollow structural member to define the position of adhesive covered macrospheres blown into the cavity of the hollow structural member.

A still further feature, object and advantage of the invention resides in the method of filling an end portion of a structural member with styrofoam particles and then filling the portion to be reinforced with a plurality of adhesive covered macrospheres so that subsequent heating of the structural member in a paint curing oven vaporizes the styrofoam to leave an empty space in the structural member and simultaneously cures the adhesive to bond the macrospheres into a rigid structural reinforcing mass having interstices between the macrospheres to conduct airflow to and from the void left by the vaporized styrofoam.

A still further object, feature and advantage of the invention resides in the reinforcement of a structural member via adhesively bonded together macrospheres of 3 to 9 mm. diameter, with the adhesive and macrospheres mixed in a proportion which leaves open interstices between the adjacent macrospheres thereby defining an airflow and moisture communicating passage through the reinforcement.

DESCRIPTION OF THE DRAWINGS

These and other features, objects and advantages of the invention will become apparent upon consideration of the specification and the appended drawings in which:

FIG. 3 is a section through a tubular structural member showing a second embodiment of the invention;

FIG. 4 is a section taken in the direction of arrows 4—4 of FIG. 3; and

FIG. 5 is a view similar to FIG. 3 showing a third embodiment of the invention.

DESCRIPTION OF THE PREFERRED EMBODIMENT

Figure 1:
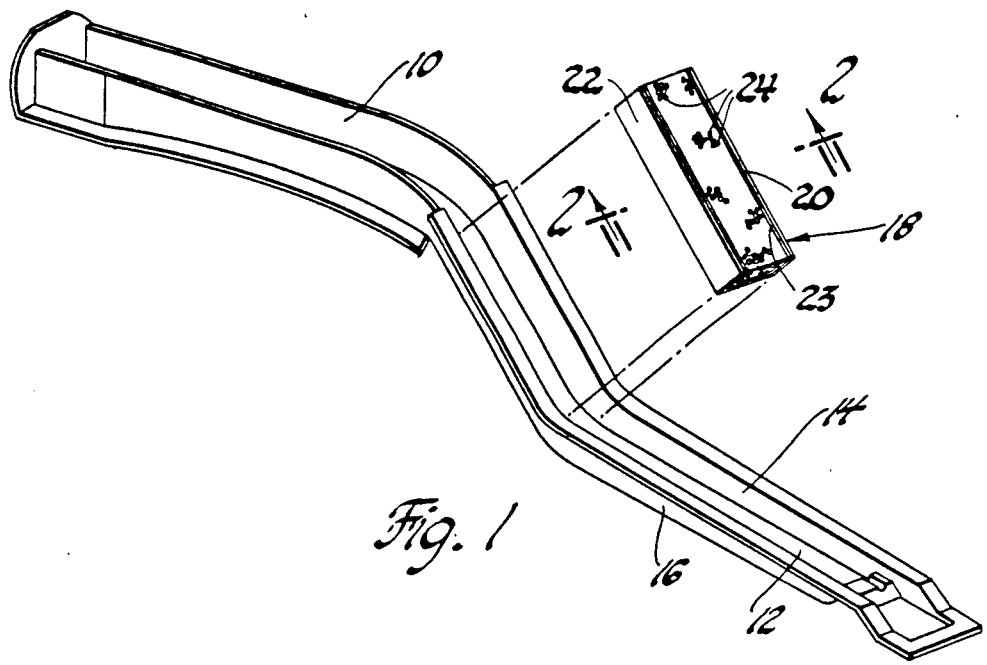
FIG. 1 is a perspective view of a reinforced vehicle body structural member according to a first embodiment of this invention.

Referring to FIG. 1 there is shown a vehicle body structural member 10 such as a stamped steel frame member having a base wall 12 and spaced apart side walls 14 and 16 which are upstanding to define an upwardly opening channel. A reinforcement, generally indicated at 18, is provided for reinforcing and stiffening a localized portion of the structural member 10.

The reinforcement 18 includes a flexible sheet material such as fiberglass cloth 20. The fiberglass cloth 20 is dipped or otherwise saturated with a suitable adhesive such as a one-part low temperature cured epoxy. A coating 22 of high temperature cured adhesive, such as a one-part or two-part epoxy is metered onto at least one face of the fiberglass cloth so that the total thickness of the coated fiberglass cloth is in the range of 0.5 to 1.5 mm.

After the low temperature cured epoxy cures and stiffens, the coated fiberglass cloth is then stamped or otherwise plastically deformed in a die into a U-shape to fit closely within the walls of the structural member 10 and then define a cavity 23. Alternatively, this forming of the coated fiberglass cloth 20 may be performed by using a tool to force the coated fiberglass cloth directly into the structural member 10. In either case the coated fiberglass cloth 20 is formed so that the face with the coating 22 of high temperature cured epoxy becomes the outer face of the reinforcement 18 and is adjacent to the base wall 12 and the side walls 14 and 16 of the structural member 10.

A plurality of glass macrospheres 24, preferably of 3 to 9 mm. in diameter, are coated with a suitable adhesive in a mixer and then poured into the formed fiberglass cloth 20 to form a honeycomb-like structure which fills the cavity 23. Such macrospheres are commercially available as glass bubbles from the 3M Company. The adhesive may be a one or two-part epoxy of the type which cures at either a low temperature or a high temperature. The adhesive preferably provides approximately 30–40% by weight of the mixture. This proportion is selected to provide sufficient adhesive to properly bond the macrospheres together without filling the interstices therebetween so that air communicating voids 26 will remain between the bonded together macrospheres 24. Preferably, a low temperature cured epoxy is used to bond the macrospheres 24 to one another and to the coated fiberglass cloth 20 at room temperature to facilitate subsequent handling of the reinforcement 18.

Figure 2:
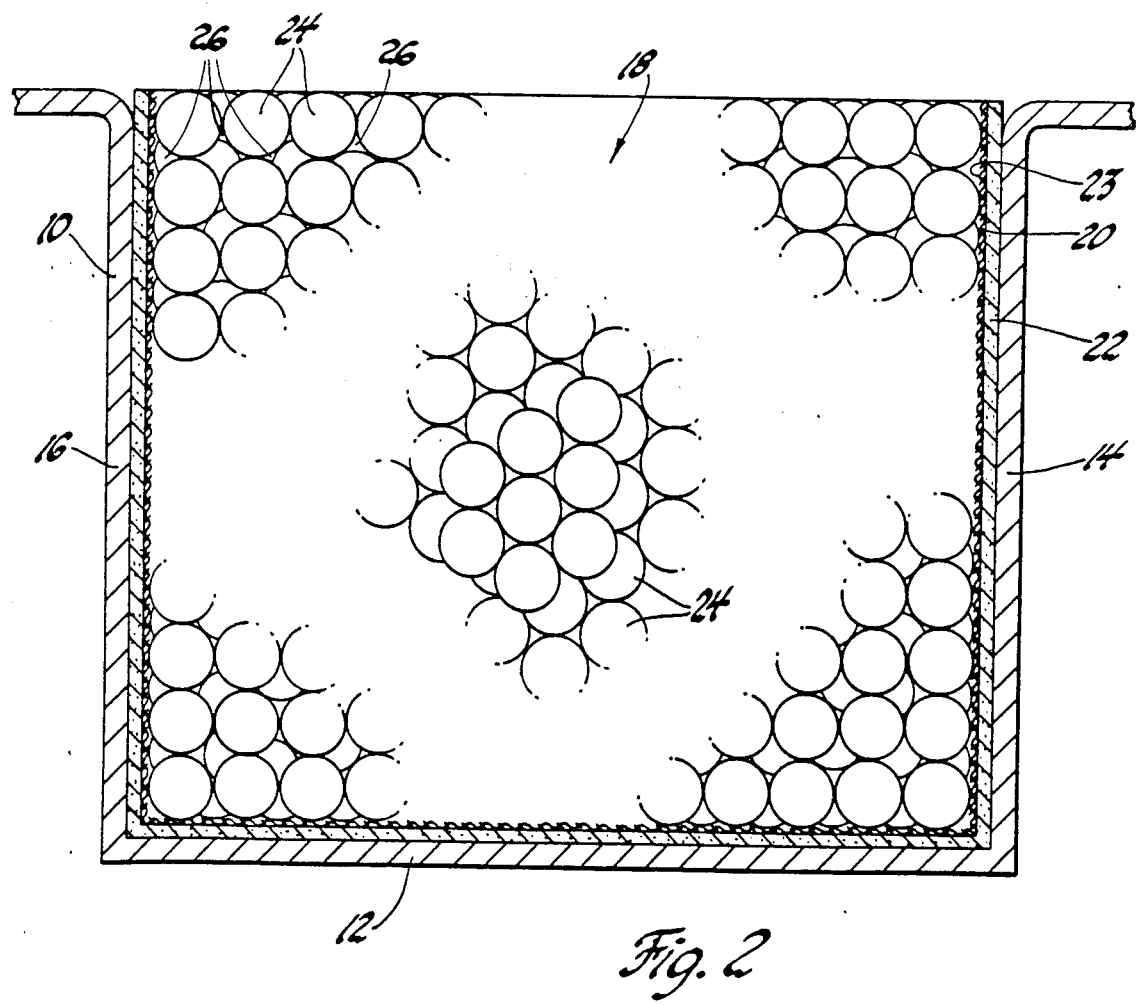
FIG. 2 is a section through the reinforced structural member, taken in the direction of arrows 2—2 of FIG. 1.

As seen in FIG. 2, the coated and formed fiberglass cloth 20 is placed in the structural member 10 with the coating 22 of high temperature cured epoxy contacting with the walls of the structural member 10. Accordingly, subsequent heating of the structural member 10 and reinforcement 18 in an oven cures the coating 22 of high temperature cured epoxy to bond the coated fiberglass cloth 20 to the base wall 12 and the side walls 14 and 16 of the structural member 10. This heating of the structural member 10 conveniently occurs in the paint curing ovens of the automobile body assembly plant which conventionally heats the vehicle body to temperatures in the area of 275°.

Considering the above-described method and structure for reinforcing a vehicle body structural member, it will be appreciated that there are several ways in which this invention may be employed in the processing of vehicle bodies. For example, it may be convenient to place the reinforcement 18 in the structural member 10 in the stamping plant where the structural member 10 is fabricated. Accordingly, when the structural member 10 is shipped to the vehicle assembly plant, the reinforcement 18 is already in place when the structural member 10 is welded or otherwise assembled into the vehicle body. Then, when the vehicle body passes through the paint oven, the high temperature cured epoxy coating 22 on the outside face of the reinforcement 18 is cured to adhere the reinforcement 18 to the structural member 10.

The reinforcement 18 is held in place in the structural member 10 by the tackiness of the high temperature cured epoxy coating 22 and by the frictional interfit of the stiffened coated fiberglass cloth 20 against the structural member 10. If sufficient tackiness is not provided by the uncured high temperature cured epoxy coating 22, a small bead of low temperature cured adhesive may be applied at localized areas on the outside face of the reinforcement 18 to temporarily hold the reinforcement in place.

On the other hand, the reinforcement 18 may be installed into the structural member 10 in the vehicle assembly plant: before, during or after the installation of the structural member 10 into the vehicle body.

Alternatively an ambient temperature curable adhesive may be employed in place of the high temperature cured epoxy coating and would be applied to the outer surface of the reinforcement 18 just porior to its installation into the structural member 10.

Furthermore, it will be appreciated that the reinforcement 18 is a composite assembly in which both the air permeable structure of macrospheres 24 and the epoxy stiffened formable fiberglass cloth 20 each provide a reinforcing effect on the structural member 10. Subject to variation in the adhesive strengths, materials, and surface preparations, it is estimated that 50% of the added strength is contributed by the epoxy coated fiberglass cloth 20 and 50% of the added strength is provided by the macrospheres 24.

It will be understood that the preceding description of the reinforcement 18 of this invention as shown in FIGS. 1 and 2 is particularly well suited to the reinforcement of an open top channel-type section as shown in FIG. 1 where the reinforcement 18 may be prefabricated and then installed into the channel. It will also be understood that the shape of the reinforcement 18 is not limited to that of the rectangular block shown in FIG. 1 but can be preformed to any shape appropriate to fit the shape of the structural member 10 to be reinforced. In particular, reinforcement 18 may be shaped for adhesive securement to the exterior of a structural member instead of the interior as shown in FIG. 1.

FIGS. 2–5 show a second embodiment of the invention which is particularly suited to reinforcing a tubular structural member having a closed section, such as a rectangular cross-section frame with a closed top as shown in FIGS. 3, 4 and 5.

Referring to FIGS. 3 and 4, it is seen that the structural member 30 is comprised of C-shaped channels 32 and 34 which are welded together along their length by weld beads 36 and 38. A baffle 40, having air passages 41 of lesser diameter than the macrospheres, is welded or otherwise suitably positioned in the structural member 30 at a point along its length which will determine the location of the end of the reinforcement to be installed therein.

Referring to FIG. 3, there is shown a schematic representation of the equipment used to install the adhesive coated glass macrospheres 42 into the structural member 30. A hopper 44 is filled with a charge of macrospheres 42 in a volume which will form the desired reinforcement inside the structural member 30. The hopper 44 has an outlet 46 at the bottom thereof which communicates with a hose 48 having a feed probe 50 attached to the end thereof. An air source such as a compressor 52 is connected to the other end of the hose 48 adjacent the outlet 46. A valve 54 is provided at the outlet 46.

When the valve 54 is opened, the macrospheres 42 are dropped by gravity through the outlet 46 and into the hose 48 for conveyance by the airstream through the feed probe 50 into the structural member 30. The macrospheres 42 are impinged against the baffle 40 and the air flows between the macrospheres, through the baffle, and out the open end 56 of the structural member 30. The macrospheres 42 may be coated with a dry adhesive before being placed into the hopper 44 or the adhesive may be applied to the macrospheres inside the feed probe 50.

Referring to FIG. 3, it is seen that the macrospheres 42 are packed against one another at a longitudinal position within the structural member 30 determined by the location of the baffle 40 and the volume of macrospheres 42 dumped into the hopper 44 will determine the length of the portion of the structural member 30 which becomes reinforced. The adhesive coating the macrospheres is sufficiently tacky to hold the macrospheres at the closely packed together position of FIG. 3 until an ambient curable adhesive has time to cure or until the vehicle body progresses through the assembly plant and into the paint curing oven for curing a high temperature cured adhesive. In the paint curing oven the temperature rises to above 275° and the adhesive cures to bond the macrospheres 42 together and to the walls of the structural member 30.

Referring to FIG. 5, there is shown an alternative method for installing the macrospheres 42 into the structural member 30. More particularly, the hopper 44 is first filled with a charge of a heat vaporizable material such as styrofoam pellets 58 and then the macrospheres 42 are placed atop the styrofoam pellets 58. Accordingly, when the valve 54 is opened, the styrofoam pellets 58 are first blown into the endmost portion of the structural member 30, against an apertured air pervious end wall 60 thereof, and then the macrospheres 42 are deposited into the structural member 30. By precisely measuring the charge of styrofoam pellets, the longitudinal location of the macrospheres 42 within the structural member 30 will be determined so that the reinforcement will result at the desired localized portion of the structural member 30. When the vehicle traverses the paint curing oven, the adhesive coating the macrospheres 42 is cured and the styrofoam pellets 58 are vaporized by the heat. Thus, the macrospheres reinforcement is installed in place and the airflow is maintained through the macrospheres 42 between the opposite ends of the structural member 30.

It will be understood that the strength of the reinforcement provided by the bonded together macrospheres 42 is dependent upon the characteristics of the macrospheres, such as size, hardness, density, material, etc. Thus, by stratifying the charge of macrospheres in the hopper 44, the reinforcing characteristics of the reinforcement can be varied along its length. Thus, the charge of macrospheres 42 in the hopper 44 may be stratified as desired to tailor the characteristics of the reinforcement to the particular needs of the vehicle. For example, a first charge of relatively hard macrospheres could provide a strong reinforcement of first portion of the structural member 30 and then a second charge of relatively softer macrospheres could provide a relatively less strong reinforcement of a second portion of the structural member.

Thus, it is seen that the invention provides a new and improved reinforcing method and apparatus for a vehicle body structural member.

The embodiments of the invention in which an exclusive property or privilege is claimed are defined as follows:

1. A method of reinforcing a selected portion of the walls of a structural member comprising the steps of:
   coating macrospheres composed of bonded together hollow microspheres and having a diameter of 3 to 9 mm. with a curable adhesive in an amount effective to bond together adjacent macrospheres and yet leave voids between the macrospheres upon subsequent curing of the curable adhesive;

close-packing the adhesive coated macrospheres into the structural member at a selected portion thereof to be reinforced so that the macrospheres engage the structural member walls and engage one another; and curing the adhesive to create adhesive bonding between the macrospheres and the structural member whereby the structural member is reinforced by the bonded together mass of macrospheres and airflow is permitted through the structural member via the voids between the closely packed adhesively bonded macrospheres.

2. The method as in claim 1 wherein the adhesive coating the macrospheres is a heat curable adhesive and the structural member is heated to cure the adhesive.

3. A method of reinforcing a selected portion of the walls of an elongated structural member and maintaining airflow therethrough comprising the steps of:

saturating a permeable flexible sheet material with a low temperature cured adhesive to stiffen the sheet material for subsequent plastic deformation;

coating at least an outer face of the sheet material with a high temperature cured adhesive;

plastically deforming the previously stiffened sheet material into a shape to closely fit the selected portion of the walls of the structural member to be reinforced with an outer face contacting the structural member wall;

coating a plurality of macrospheres with a low temperature cured adhesive, said macrospheres being comprised of bonded together hollow microspheres and having a diameter of 3 to 9 mm. and said low temperature cured adhesive being provided in an amount that bonds adjacent macrospheres without filling the space between the macrospheres so that open air passage voids remain between the macrospheres;

filling the deformed sheet material with the adhesive coated macrospheres and allowing the low temperature cured adhesive to cure so that the macrosphere filled stiffened sheet material defines a preformed reinforcement member having a high temperature cured adhesive on the outer face thereof and an air permeable structure of macrospheres bonded together;

placing the preformed reinforcement member into the structural member with the outer face of the sheet material in contact with the structural member wall; and heating the structural member and reinforcement member to cure the high temperature cured adhesive and thereby effect an adhesive bond between the reenforcement member and the structural member wall and enable airflow longitudinally of the elongated structural member.

4. A method of reinforcing a selected portion of the walls of an elongated structural member and maintaining airflow therethrough comprising the steps of:

coating at least one surface of a permeable flexible sheet material with a high temperature cured adhesive;

pressing the coated sheet material into the structural member so that the high temperature cured adhesive contacts against the structural member and the sheet material defines a cavity;

coating a plurality of macrospheres with a low temperature curable adhesive, said macrospheres being composed of a plurality of hollow microspheres bonded together and having a diameter of 3 to 9 mm., said low temperature curable adhesive being in an amount effective to bond together adjacent macrospheres and yet leave voids between the macrospheres;

filling the cavity of the sheet material with adhesive covered macrospheres and allowing the low temperature cured adhesive to cure, thereby bonding the macrospheres to each other and to the sheet material with air circulating voids between the macrospheres to enable airflow longitudinally of the elongated structural member; and heating the structural member to cure the high temperature cured adhesive whereby the macrospheres, epoxy cloth and structural member are bonded together to reinforce the structural member and permit airflow logitudinally therethrough.

5. A method of reinforcing a selected portion of the walls of a structural member comprising the steps of:

coating macrospheres composed of bonded together hollow microspheres and having a diameter of 3 to 9 mm. with a curable adhesive in an amount effective to bond together adjacent macrospheres and yet leave voids between the macrospheres upon subsequent curing of the curable adhesive;

installing an air permeable means inside the structural member at a location to define the end of the selected portion of the structural member to be reinforced, said air permeable means being permeable to the airflow but impermeable to the macrospheres;

air blowing the adhesive coated macrospheres into the structural member so that the macrospheres engage the air permeable means and structural member walls and engage one another in close-packed relation relative one another and the blowing air exits via the voids between the macrospheres;

curing the adhesive to create adhesive bonding between the macrospheres and the structural member whereby the selected portion of the structural member is reinforced by the bonded together mass of macrospheres and airflow is permitted through the structural member via the voids between the closely packed adhesively bonded macrospheres.

6. A method of reinforcing a selected lngitudinal portion of the walls of an elongated tubular structural member comprising the steps of:

installing a baffle in the tubular structural member at a location therein at one end of the longitudinal portion to be reinforced, said baffle defining openings to permit airflow communication therethrough;

coating macrospheres comprised of bonded together hollow microspheres and having a diameter of 3 to 9 mm. with a curable adhesive, said adhesive comprising not more than 40% by weight of the macrospheres and adhesive mixture so that voids remain between adjacent macrospheres;

blowing the adhesive coated macrospheres into the elongated tubular structural member through the end of the structural member opposite the baffle so that the adhesive covered macrospheres impinge against the baffle and fill the selected length portion of the structural member; and curing the curable adhesive to effect adhesive bonding between the macrospheres and the structural member whereby the structural member is reinforced with the voids between the adjacent bonded together macrospheres and the airflow openings defined by the baffle permitting airflow through the tubular structural member.

7. A method of reinforcing a selected portion of the walls of an elongated structural member and maintaining airflow therethrough comprising the steps of:

forming an adhesive coated sheet material in a shape to closely fit the walls of the structural member to be reinforced;

filling the formed adhesive coated sheet material with adhesive covered macrospheres, said macrospheres being composed of bonded together microspheres and having a diameter of 3 to 9 mm., said adhesive coating the macrospheres being in sufficient amounts to effectively bond together adjacent macrospheres and define an air passage void between the macrospheres; and adhesively bonding the coated sheet material to the structural member walls whereby the macrospheres, sheet material and structural member are bonded together to reinforce the structural member are airflow is maintained through the elongated structural member.

* * * * *